United States Patent [19]

Haggstrom

[11] Patent Number: 5,086,856
[45] Date of Patent: Feb. 11, 1992

[54] METHOD AND APPARATUS FOR WEIGHING A WHEEL SUPPORTED LOAD

[75] Inventor: Rolf P. Haggstrom, East Walpole, Mass.

[73] Assignee: Flintab AB, Västerås, Sweden

[21] Appl. No.: 616,073

[22] Filed: Nov. 20, 1990

[51] Int. Cl.$^5$ .................................. G01G 23/00
[52] U.S. Cl. .................. 177/161; 177/211; 177/253; 177/1
[58] Field of Search ............. 177/161, 162, 211, 238, 177/239, 244, 253, 264, 145, 131, 148, 151, 152, 241, 243, 1

[56] References Cited

U.S. PATENT DOCUMENTS

| | | | |
|---|---|---|---|
| 344,762 | 6/1886 | Witherell | 177/244 |
| 581,889 | 5/1897 | Swindell | 177/239 |
| 717,785 | 1/1903 | Weidlinger | 177/239 |
| 2,962,276 | 11/1960 | Thurston | 177/239 |
| 3,191,701 | 6/1965 | Gray | 177/239 |
| 3,630,299 | 12/1971 | Albagli | 177/145 |
| 3,732,938 | 5/1973 | Nelson | 177/126 |
| 3,961,675 | 6/1976 | Siegel | 177/126 |
| 4,126,197 | 11/1978 | Kechely | 177/145 |
| 4,958,526 | 9/1990 | Haggstrom | 177/211 X |
| 4,979,580 | 12/1990 | Lockery | 177/211 |

*Primary Examiner*—Benjamin R. Fuller
*Assistant Examiner*—Randy W. Gibson
*Attorney, Agent, or Firm*—Staas & Halsey

[57] ABSTRACT

A weighing method for a wheel supported load, such as a hospital bed, uses a weighing device having a base with a flat bottom surface, and a track surface for a wheel arranged parallel to the bottom surface. The track surface is supported on an arrangement for sensing weight which includes a pair of cantilever bending beams with strain gages, and one end of the track surface extends beyond the end of the flat bottom surface. To start weighing, the weighing device is first tilted, so the track surface can be wedged between a wheel and the floor. In this position the track surface acts as a ramp for the wheel. The wheel is next rolled up onto the track surface until it is above the front edge of the flat bottom surface. At this point the weighing device will flip over by gravity to rest on the flat bottom surface, and the weighing of the load can be done without risk for force shunting to the floor. A weighing device suitable for use with the method is also disclosed.

14 Claims, 3 Drawing Sheets

METHOD AND APPARATUS FOR WEIGHING A WHEEL SUPPORTED LOAD

BACKGROUND OF THE INVENTION

The present invention relates to weighing of hospital beds and other loads supported on wheels or casters.

A basic method for weighing a hospital bed requires that the entire bed be rolled onto a stationary scale platform flush with a floor. This method limits the weighing to one or a few locations in a hospital, which makes weighing inconvenient. Moreover, the scale installation is very expensive.

It is also known to use load cell units placed on top of the floor, and to transfer the load on each leg of the bed to the load cell units by means of special weighing supports, which are arranged to be lowered onto the load cell units for weighing, for instance by retracting the casters. This method makes weighing in each hospital room possible, but the use of special weighing supports on the legs require special and more expensive beds.

It is also possible to use load cell units placed on top of the floor in conjunction with ramps placed on the floor next to the load cell units, so the wheels can be rolled from the floor onto the load cell units via the ramps. For accurate weighing it is, however, necessary to avoid force shunting past the load cell units, so the operator must assure that all four wheels under the bed are transferred fully from the ramps to the load cells, and that no active part of any load cell unit touches the ramps during weighing. The ramps add considerably to the space required for the weighing system, and heavy effort is required to roll the casters uphill on the ramps.

SUMMARY OF THE INVENTION

The invention is an improved method and apparatus for weighing of loads supported on wheels or casters, such as hospital beds, using load cell units on top of a floor and rolling the wheels up on the load cell units, but without need for separate ramps. Accurate weighing without risk for force shunting is assured, and the weighing device is much more compact in size and easier to use than known devices with separate ramps.

The weighing method according to the invention comprises the steps of providing a weighing device having a base with (i) a bottom surface with a front edge and (ii) a track surface substantially flat in the direction of wheel travel and substantially parallel to and above said bottom surface with a first end of the track surface extending beyond said front edge of the bottom surface; placing the weighing device on a floor adjacent a wheel supporting a load to be weighed; tilting the weighing device about said front edge of the bottom surface so said first end of the track surface can be wedged under the wheel; and rolling the wheel up on the track surface until the wheel is beyond the front edge of the bottom surface of the base, whereby the weighing device flips by gravity onto the bottom surface.

A weighing device according to the invention comprises a base having a bottom surface designed to rest movably on a floor, and a front edge on said bottom surface; means, supported by said base, for sensing force; and track means for supporting a wheel, said track means being substantially flat in the direction of wheel travel and fixedly mounted on said means for sensing force in substantially parallel alignment above said bottom surface and having a first end extending beyond said front edge of said bottom surface, whereby the first end of the track means can be wedged under a wheel when the base is tilted about said front edge.

DETAILED DESCRIPTION OF PREFERRED EMBODIMENTS

Figure 2:
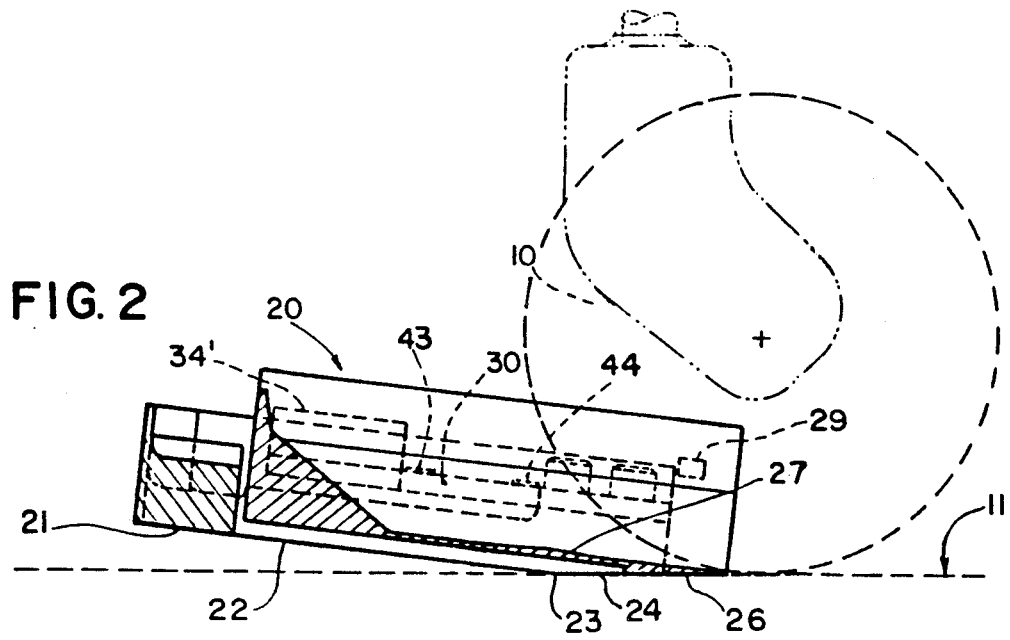
FIG. 2 is a cross-sectional view similar to FIG. 1, but showing the weighing device in a tilted position, wedged under a caster.
Figure 3:
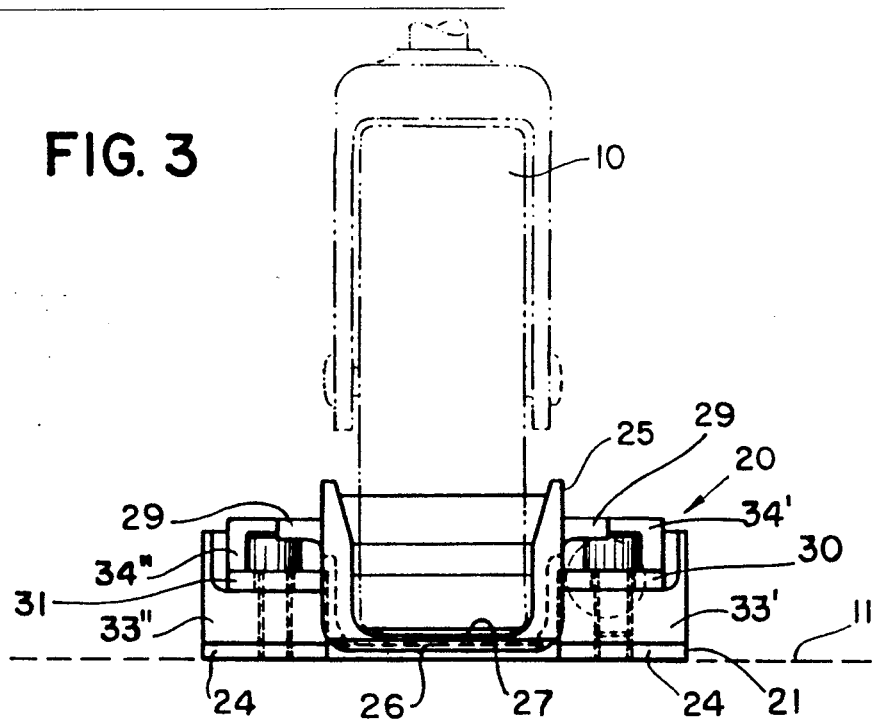
FIG. 3 is an end view of a weighing device according to the invention with its cover removed.
Figure 4:
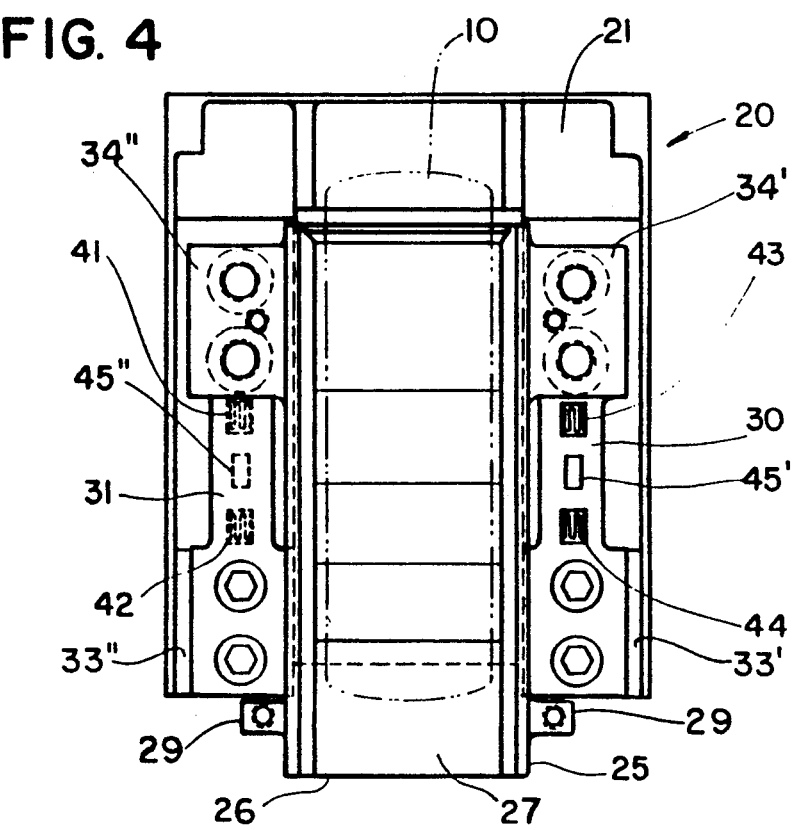
FIG. 4 is a top view of a weighing device according to the invention with its cover removed.
Figure 5:
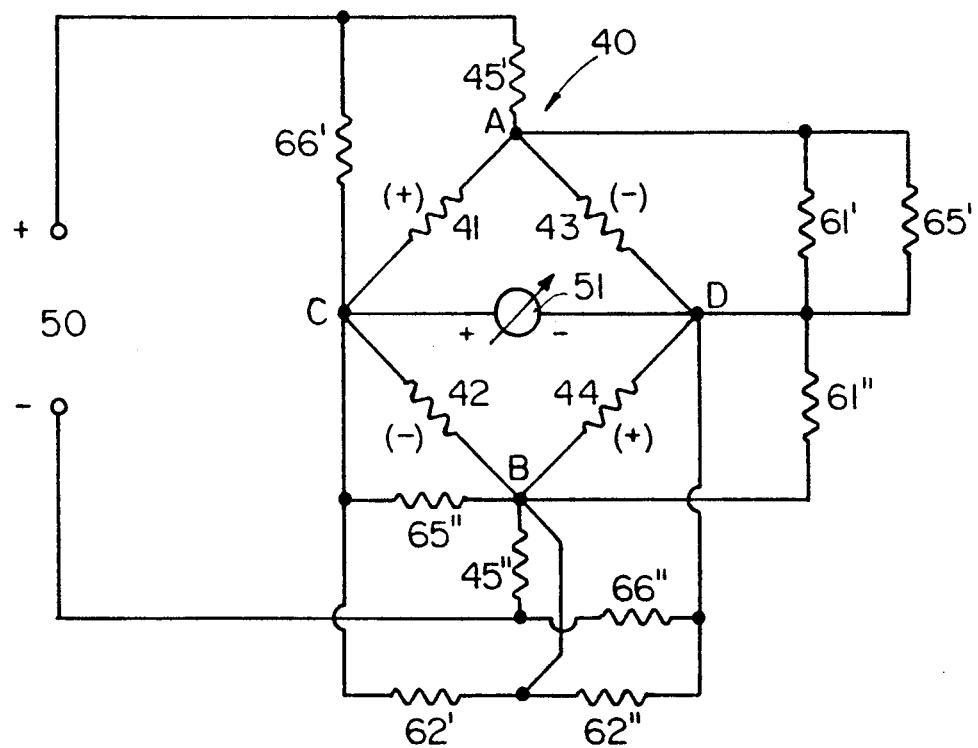
FIG. 5 is a Wheatstone bridge circuit arrangement of strain gages and trimming resistors for a weighing device as shown in FIGS. 1–4.

FIGS. 1–4 show a weighing device 20 with a base 21 having a bottom surface 22 designed to rest movably on a floor 11, which is indicated in phantom lines. Beams 30 and 31 each have front ends bolted to horizontal pads 33' and 33" respectively in the base 21, and at their rear ends the beams 30, 31 support a channel 25 with an open top via wings 34', 34" on the outside walls of channel 25. A track surface 27 inside the channel 25 extends parallel to the bottom surface 22 of the base 21. A front end 26 of channel 25 extends beyond a front edge 23 of the bottom surface 22 of the base 21, so that the track surface 27 can be brought down close to the floor 11 by tilting the weighing device 20 about the front edge 23. The beams 30 and 31 have strain gages 41–44 bonded near their ends, as shown in FIG. 4, with the strain gages bonded to the top surface of one beam (30), and to the bottom surface of the other beam (31). The strain gages 41, 42, 43, 44 are connected together in a conventional bridge circuit 40 as shown in FIG. 5. Temperature compensating resistors 45', 45" are also bonded to the beams 30, 31, as is conventional in the art.

The weighing device 20 will in practice be covered by a sweep arranged to protect the strain gages and the wiring inside the weighing device 20. The sweep will be supported by channel 25 via screws in threaded holes on pads 29 at the front end of the channel 25, and in wings 34' and 34". The sweep does not affect the function of the weighing device 20, so it has been omitted from FIGS. 1–4 in the interest of clarity of illustrations.

It is readily understood by those skilled in the art that beams 30 and 31 form a pair of guided cantilever bending beams, and that they will flex in an S-shape when a weight is placed on the track surface 27 between the support pads 33', 33" on the base 21 and the wings 34', 34" on channel 25. This means that strain gage 41 on the bottom of the rear end of beam 31 always will sense tensile strain, while strain gage 42 on the bottom of the front end of beam 31 always will sense compressive strain. Strain gage 43 at the rear end of beam 30 is, however, on the top surface, so it will always sense compressive strain, and strain gage 44 on the top of the front end of beam 30 will always sense tensile stress. This has been indicated in FIG. 5 by + signs for tensile strain and − signs for compressive strains next to the symbols for strain gages 41, 42, 43, 44.

When a supply voltage 50 is applied to one bridge diagonal A-B as shown in FIG. 5, an output signal proportional to a weight acting on the track surface 27 of channel 25 appears across the other bridge diagonal C-D. A voltage sensing instrument 51 connected to this output voltage can accordingly be used as a measure of the weight acting on the channel 25 via a caster 10, indicated in phantom lines in FIGS. 1–4.

It is well known in the art that the individual strain gages in a bending beam arrangement as described above will have small differences in force sensitivity, so the weight indication will vary with the position of the point of load application in an uncompensated weighting device. Accurate weight readings is obtained with an uncompensated weighing device only when the caster 10 rests at a predetermined weighing spot, preferably at the midpoint of bending beams 30, 31, so all strain gages sense equal strain. To assure such a predetermined loading position, the track surface 27 can be provided with a shallow cylindrical depression to center the caster during weighing.

Alternatively, the weight indication can be made substantially independent of the load application point by compensating for differences in force sensitivity among the strain gages, for instance by means of resistor pairs 61', 61" and 62', 62" as shown in FIG. 5, for sensitivity adjustment as described in U.S. Pat. No. 4,979,580, and resistor pairs 65', 65" and 66', 66", as shown in FIG. 5, for zero adjustment as described in U.S. Pat. No. 4,958,526.

The use of dual guided cantilever bending beams 30, 31 for weight sensing provides a very low profile weighing system of very high accuracy. The track design for the caster described above uses the inside bottom 27 of a channel 25 as the track surface. This provides a stiff track with very low thickness required under the track surface 27. The track surface 27 is also arranged underslung below the top of the already low profile weighing beams 30, 31, as shown in FIG. 3, by using wings 34', 34" on the outside walls of channel 25, above the track surface 27, as supports for the channel 25. The design shown thus provides for a track surface 27 very close to the floor 11, which means that the caster 10 only needs to be rolled up a small height for weighing. The inside width of the channel 25 should be made as narrow as the width of the caster 10 will allow, in order to keep the caster 10 from twisting around its vertical shaft when the caster 10 is rolled off the weighing device. This eliminates binding and uncontrolled "walking" of the caster 10.

Channel 25 has an end 26 that extends beyond the edge 23 of the bottom surface 22 of base 21, so the bottom edge of channel 25 will touch the floor 11 when the weighing device 20 is tilted to the right about the edge 23, as shown in FIG. 2. In this way, channel 25 is converted to a ramp that can be wedged under the caster 10, to allow the caster 10 to be rolled up on the weighing device 20. No external ramp is thus needed with a weighing device according to the invention. This reduces the cost and complexity of the weighing installation, and also makes the weighing device very compact.

Figure 1:
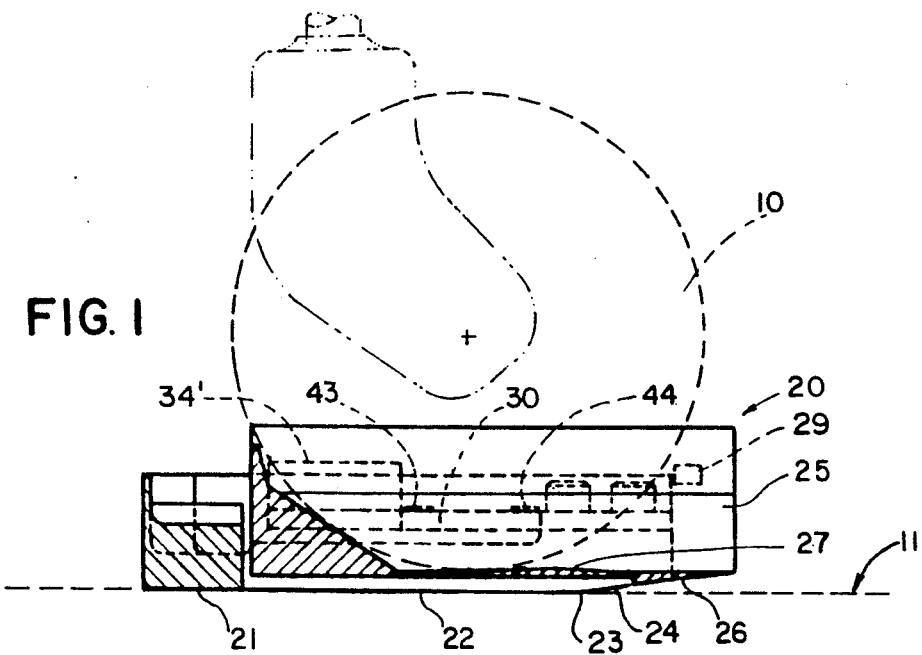
FIG. 1 is a vertical cross-sectional view lengthwise through a weighing device according to the invention along a symmetry line, with the weighing device in position for weighing.

When the caster 10 is moved to the left in FIG. 2, it will ride up the ramp formed by the track surface 27 in the tilted channel 25. As soon as the caster 10 passes a point above the edge 23 of the bottom surface 22, the weight on caster 10 will force the entire weighing device 20 to flip back to its horizontal weighing position as shown in FIG. 1. The end 26 of channel 25 is thereby lifted away from the floor 11, so risk for force shunting during weighing is eliminated. The weight reading will thus be accurate without any special care on the part of the operators of the weighing process.

FIGS. 1 and 2 also show that in the tilted position of the weighing device 20, the underside of end 26 of the track surface 27 can be made to meet the floor 11 smoothly, without a step, by tapering the underside of the front end 26 of channel 25. FIGS. 1–4 further show tapered extensions 24 added to the base 21 in front of the front edge 23. Such extensions 24 serve several useful purposes. They allow the support pads 33', 33" for the front end of bending beams 30, 31 to be placed further forward than the front edge 23 of the bottom surface 22, thereby shortening the overall length of the weighing device 20. They also protect the protruding end 26 of channel 25, and they can be designed to protect the floor 11 by providing a smooth rolling pivot for the weighing device 20 instead of a sharp edge at 23.

It should be understood that more than one weighing device according to the invention will usually be needed for weighing of a wheel supported load. A hospital bed, for example, has four caster supported legs, and all four legs are weighed simultaneously in order to get a correct total weight reading. This is done by using one weighing device according to the invention under each caster supported leg, and summing the output signals from the strain gage briges in each weighing device to provide a total weight reading. This summing procedure is well known in the art, and it is not specific to the invention, so a detailed explanation is not required here.

I claim:

1. A method for weighing a wheel supported load, comprising the steps of:
   (a) providing a weighing device having a base with (i) a bottom surface with a front edge and (ii) a track surface substantially flat in a direction of travel of the wheel and substantially parallel to and above said bottom surface with a first end of the track surface extending beyond said front edge of the bottom surface;
   (b) placing the weighing device on a floor adjacent the wheel supporting the load to be weighed;
   (c) tilting the weighing device about said front edge of the bottom surface so said first end of the track surface can be wedged under the wheel; and
   (d) rolling the wheel up on the track surface until the wheel is beyond the front edge of the bottom surface of the base, whereby the weighing device flips by gravity onto the bottom surface.

2. The method of claim 1, further comprising step (e) of measuring weight of the wheel supported load on the weighing device after the wheel supported load is positioned on the track surface.

3. The method of claim 2, wherein in step (e) the weight of the wheel supported load is measured using a pair of cantilevered bending beams on which the track surface is positioned, the beams having strain gages located thereon and connected in a Wheatstone bridge circuit.

4. The method of claim 3, wherein said weighing device includes at least four weighing devices having bridge circuits for receiving four corresponding wheels of the wheel supported load and step (e) further comprises measuring the weight of the wheel supported load by summing output signals from the bridge circuits of each of the weighing devices.

5. The method of claim 4, wherein each of the four weighing devices are independently movable on the floor for receiving the corresponding wheels of the wheel supported load.

6. A weighing device for a wheel supported load, comprising:
    (a) a base having a bottom surface adapted to rest movably on a floor, and a front edge on said bottom surface;
    (b) means, supported by said base, for sensing force; and
    (c) track means for supporting the wheel, said track means being substantially flat in a direction of travel of said wheel and fixedly mounted on said means for sensing force in substantially parallel alignment above said bottom surface and having a first end extending beyond said front edge of said bottom surface, whereby the first end of the track means can be wedged under the wheel when the base is tilted about said front edge.

7. A weighing device for a wheel supported load as specified in claim 6, wherein said track means comprises a channel with an open top, and supporting elements protruding from side walls of said channel with lower support surfaces above the inside of said bottom surface of the channel.

8. A weighing device for a wheel supported load as specified in claim 6, wherein said means for sensing force comprises a guided cantilever bending beam.

9. A weighing device for a wheel supported load as specified in claim 6, wherein said base comprises extensions tapering upwards from said front edge.

10. A weighing device for a wheel supported load as specified in claim 7, wherein said means for sensing force comprises a guided cantilever bending beam.

11. A weighing device for a wheel supported load as specified in claim 10, wherein said base comprises extensions tapering upwards from said front edge.

12. A weighing device for a wheel supported load as specified in claim 11, wherein said means for sensing force comprises a pair of guided cantilever bending beams on which said track means is mounted, said track means being positioned between said bending beams.

13. A weighing device for a wheel supported load as specified in claim 12, wherein means for sensing force comprises a Wheatstone bridge circuit and strain gages mounted on said bending beams and connected in said Wheatstone bridge circuit for providing an output signal indicative of the force being sensed.

14. A weighing device for a load supported by a plurality of wheels, comprising:
    (a) a plurality of weighing units, each of said weighing units arranged to measure a weight acting on a single wheel and each including:
        (i) a base having a bottom surface adapted to rest movably on a floor;
        (ii) a front edge on said bottom surface;
        (iii) means for sensing force supported by said base; and
        (iv) a track means for supporting said single wheel fixedly mounted on said means for sensing force in substantially parallel alignment with and above said bottom surface and having a first end extending beyond said front edge of the bottom surface, whereby the track means can be wedged under the wheel when the base is tilted about said front edge of the bottom surface.

* * * * *